United States Patent
Ivans

(10) Patent No.: US 11,021,251 B2
(45) Date of Patent: Jun. 1, 2021

(54) INSET TURRET ASSEMBLIES FOR TILTROTOR AIRCRAFT

(71) Applicant: Textron Innovations Inc., Providence, RI (US)

(72) Inventor: Steven Ray Ivans, Ponder, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/789,408

(22) Filed: Feb. 12, 2020

(65) Prior Publication Data

US 2020/0231282 A1     Jul. 23, 2020

Related U.S. Application Data

(63) Continuation of application No. 16/522,369, filed on Jul. 25, 2019, now Pat. No. 10,611,479, which is a continuation of application No. 16/251,571, filed on Jan. 18, 2019, now abandoned.

(51) Int. Cl.
   *B64D 7/06*     (2006.01)
   *B64C 7/00*     (2006.01)

(52) U.S. Cl.
   CPC . *B64D 7/06* (2013.01); *B64C 7/00* (2013.01)

(58) Field of Classification Search
   CPC ............... B64C 7/00; B64C 2201/123; B64C 2201/127; G03B 15/006; B64D 47/02; B64D 47/08; F16M 11/123; F16M 11/126
   See application file for complete search history.

(56) References Cited

U.S. PATENT DOCUMENTS

| | | | | |
|---|---|---|---|---|
| 2,992,794 A | * | 7/1961 | Boyd | F42B 15/36 244/3.15 |
| 5,497,960 A | * | 3/1996 | Previnaire | B64C 27/001 244/118.1 |
| 5,529,261 A | * | 6/1996 | Iddan | F41G 7/2213 244/3.16 |
| 5,775,643 A | * | 7/1998 | McMaster | F41G 7/2213 244/130 |
| 6,056,237 A | * | 5/2000 | Woodland | F42B 15/22 244/3.15 |
| 6,129,307 A | * | 10/2000 | Deoms | F41G 3/22 244/3.16 |
| 6,193,188 B1 | * | 2/2001 | Ahmad | F41G 7/2213 244/117 R |
| 6,274,868 B1 | | 8/2001 | Hall et al. | |
| 7,253,398 B2 | | 8/2007 | Hughes et al. | |
| 7,905,463 B2 | * | 3/2011 | Burnham | F16M 11/18 248/550 |

(Continued)

FOREIGN PATENT DOCUMENTS

WO    WO-2015149079 A1 * 10/2015 ............. F16M 13/02

*Primary Examiner* — Benjamin P Lee
(74) *Attorney, Agent, or Firm* — Lawrence Youst PLLC

(57) ABSTRACT

A nose assembly of an aircraft includes a nose airframe having a nonhorizontal mounting surface and a turret assembly mounted on the nonhorizontal mounting surface. The turret assembly includes a turret device housing rotatable relative to the nonhorizontal mounting surface. The nose airframe includes a nose skin forming a nose fairing having an apex aperture. The nose skin at least partially covers the turret assembly such that the turret assembly is at least partially inset in the apex aperture of the nose fairing.

19 Claims, 9 Drawing Sheets

(56) References Cited

U.S. PATENT DOCUMENTS

| | | | | |
|---|---|---|---|---|
| 8,139,932 B2* | 3/2012 | Zubalsky | | F41G 7/2213 396/12 |
| D665,331 S * | 8/2012 | Sands | | D12/319 |
| 8,330,646 B2* | 12/2012 | Baumatz | | G01S 17/89 342/62 |
| 8,445,822 B2* | 5/2013 | Sunne | | F42B 10/46 244/3.16 |
| 8,523,462 B2* | 9/2013 | Dimotakis | | G03B 17/561 396/428 |
| 8,559,801 B2* | 10/2013 | Dimotakis | | G03B 15/006 396/12 |
| 8,654,314 B2* | 2/2014 | King | | F41H 13/005 356/3.01 |
| 9,156,551 B2* | 10/2015 | Szarek | | F16M 11/126 |
| 9,188,481 B2* | 11/2015 | Baumatz | | G01S 7/48 |
| 9,395,467 B2* | 7/2016 | Zelinski | | B82Y 30/00 |
| 9,718,561 B2* | 8/2017 | Blackburn | | G01C 21/18 |
| 10,389,078 B2* | 8/2019 | Smiley | | H01S 3/06704 |
| 2009/0216394 A1* | 8/2009 | Heppe | | B64C 39/024 701/16 |
| 2009/0218447 A1* | 9/2009 | von Flotow | | B64C 39/024 244/131 |
| 2010/0141503 A1* | 6/2010 | Baumatz | | G01S 7/48 342/27 |
| 2011/0001020 A1* | 1/2011 | Forgac | | B64C 39/024 244/7 A |
| 2011/0205703 A1* | 8/2011 | Weaver | | G03B 17/55 361/695 |
| 2012/0140071 A1 | 6/2012 | Judell | | |
| 2012/0318919 A1* | 12/2012 | Brown | | G03B 15/006 244/120 |
| 2013/0048792 A1* | 2/2013 | Szarek | | F16M 11/18 244/175 |
| 2015/0210388 A1* | 7/2015 | Chado | | H04N 7/185 701/3 |
| 2015/0251745 A1* | 9/2015 | Zerweckh | | B64C 1/0009 137/807 |
| 2015/0350569 A1* | 12/2015 | Espersen | | H04N 5/2258 348/164 |
| 2016/0325127 A1* | 11/2016 | Billman | | A62C 3/0285 |
| 2017/0175948 A1* | 6/2017 | Zeise | | F16M 11/126 |
| 2018/0007248 A1* | 1/2018 | Zeise | | H04N 5/2253 |
| 2018/0273158 A1* | 9/2018 | Courtin | | B64C 1/26 |

* cited by examiner

INSET TURRET ASSEMBLIES FOR TILTROTOR AIRCRAFT

CROSS-REFERENCE TO RELATED APPLICATIONS

The present application is a continuation of co-pending application Ser. No. 16/522,369 filed Jul. 25, 2019 which is a continuation of application Ser. No. 16/251,571 filed Jan. 1, 2018.

TECHNICAL FIELD OF THE DISCLOSURE

The present disclosure relates, in general, to turret assemblies for use on aircraft and, in particular, to rotatable turret assemblies mounted on a nonhorizontal surface and inset in an aperture formed by the nose of the aircraft to reduce the drag experienced by the aircraft during flight.

BACKGROUND

Aircraft must balance the need for operational payloads, or devices, with flight efficiency requirements including weight, drag and maneuverability requirements. Certain operational payloads such as weapons, sensors and cameras are typically mounted on the underside of the aircraft fuselage to maintain a clear line of sight to their intended target. Such operational payloads are often rotatable about one or more axes to allow for targeting of specific elements in the air or on the ground. One common type of exterior rotatable payload is a gun turret mounted on the underside of an aircraft's fuselage. Gun turrets typically house a weapon, and sometimes a crew member, while being capable of some degree of azimuth and elevation, or cone of fire, through which the weapon may be aimed and fired. Another type of exterior rotatable payload is a gimballed sensor turret that hangs from the underside of an aircraft's fuselage and employs sensors to perform airborne observation, surveillance or reconnaissance.

One reason why such exterior rotatable payloads are mounted on the underside of the fuselage is because the fuselage underside presents a horizontal surface, which provides an orthogonal and predictable load and center of gravity and sometimes helps to reduce moments on the airframe of the aircraft. Undermounted external payloads, however, do not take advantage of the improved structural strength of modern aircraft airframes and also increase the forward-facing profile of the aircraft, thereby increasing drag and reducing aircraft efficiency. Accordingly, a need has arisen for turret systems that allow rotatable operational payloads to be mounted to aircraft without incurring the drag penalty of existing undermounted turret systems.

SUMMARY

In a first aspect, the present disclosure is directed to a nose assembly of an aircraft including a nose airframe having a nonhorizontal mounting surface and a turret assembly mounted on the nonhorizontal mounting surface. The turret assembly includes a turret device housing rotatable relative to the nonhorizontal mounting surface. The nose airframe includes a nose skin forming a nose fairing having an apex aperture. The nose skin at least partially covers the turret assembly such that the turret assembly is at least partially inset in the apex aperture of the nose fairing.

In certain embodiments, the nonhorizontal mounting surface may be a vertical mounting surface. In some embodiments, the nonhorizontal mounting surface may be disposed inside the nose fairing. In certain embodiments, the turret assembly may protrude from the nonhorizontal mounting surface in a forward direction. In some embodiments, the turret device housing may be a gimballing turret device housing rotatable about at least two axes. In certain embodiments, the turret assembly may include a turret mount coupling the turret device housing to the nonhorizontal mounting surface. In some embodiments, the turret mount may include a base and a forked housing mount, and the base may be disposed inside the nose fairing. In certain embodiments, the forked housing mount may be rotatable about a longitudinal axis parallel to a forward flight direction of the aircraft. In some embodiments, the turret device housing may be rotatably coupled to the forked housing mount about a lateral axis perpendicular to a forward flight direction of the aircraft. In certain embodiments, the forked housing mount may protrude from the nose fairing through the apex aperture. In some embodiments, the turret device housing may be a turret sensor housing including one or more sensors such as an integrated sensor suite. In certain embodiments, the turret device housing may be a turret weapon housing including a weapon. In some embodiments, the turret device housing may be substantially spherical to form a turret ball. In certain embodiments, the nose fairing may substantially cover a rear-facing hemisphere of the turret device housing.

In a second aspect, the present disclosure is directed to an aircraft including a fuselage having a nose assembly. The nose assembly includes a nose airframe having a nonhorizontal mounting surface and a turret assembly mounted on the nonhorizontal mounting surface. The turret assembly includes a turret device housing rotatable relative to the nonhorizontal mounting surface. The nose airframe includes a nose skin forming a nose fairing having an apex aperture. The nose skin at least partially covers the turret assembly such that the turret assembly is at least partially inset in the apex aperture of the nose fairing.

In certain embodiments, the aircraft may be a helicopter, tiltrotor aircraft or unmanned aerial system. In some embodiments, the nonhorizontal mounting surface may form an acute angle with a horizontal plane of the aircraft. In certain embodiments, the turret device housing may include an outer surface contoured to form an aerodynamic apex of the nose assembly. In some embodiments, the nose fairing may cover at least 30 percent of the turret device housing. In certain embodiments, the aircraft may include a weapons turret mounted on the underside of the fuselage. In some embodiments, the nonhorizontal mounting surface may be a substantially flat and planar nonhorizontal mounting surface. In other embodiments, the nonhorizontal mounting surface may include a multifaceted surface having two or more faceted surfaces, and the turret assembly may comprise a plurality of turret assemblies each mounted to one of the faceted surfaces.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
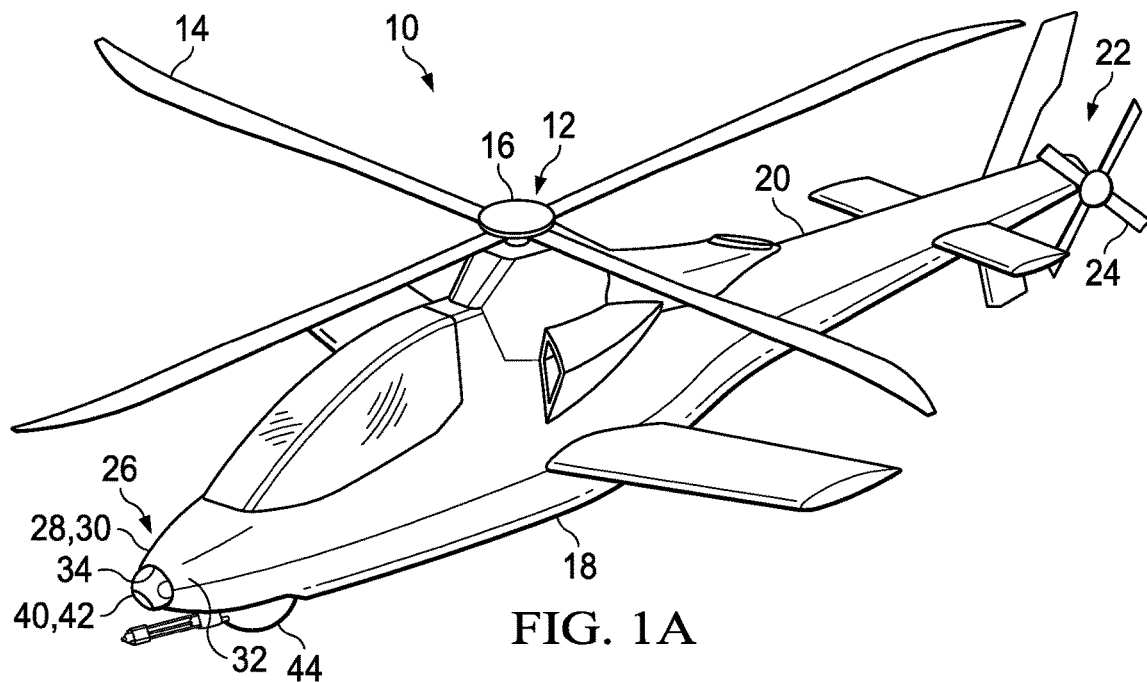
FIGS. 1A-1C are schematic illustrations of a helicopter having an inset turret assembly in accordance with embodiments of the present disclosure.
Figure 1B:
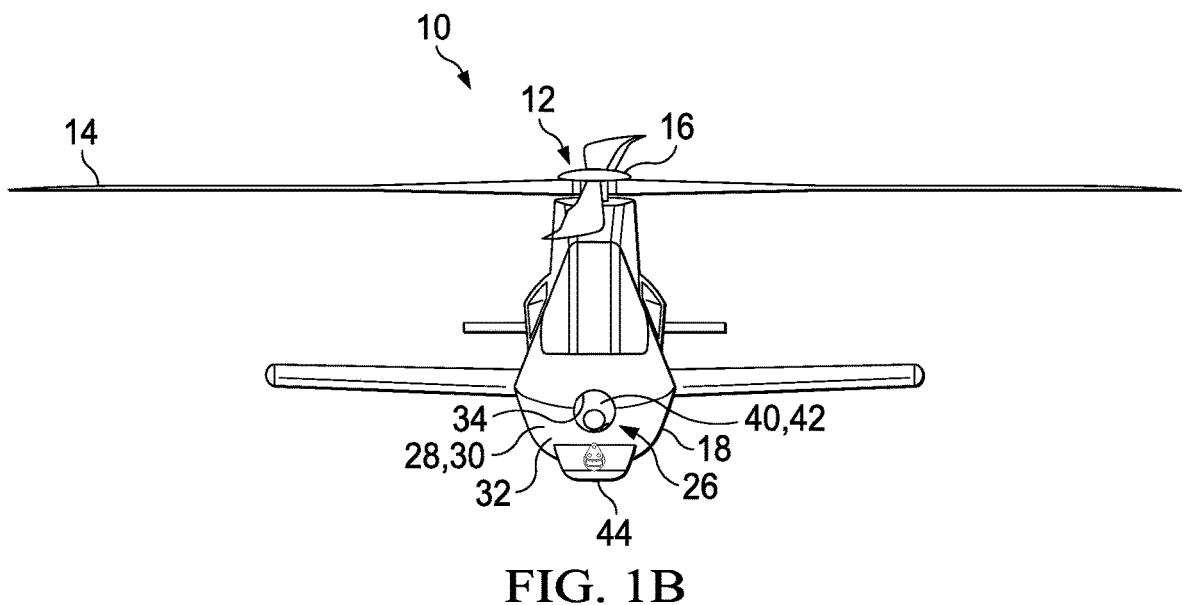
Figure 1C:
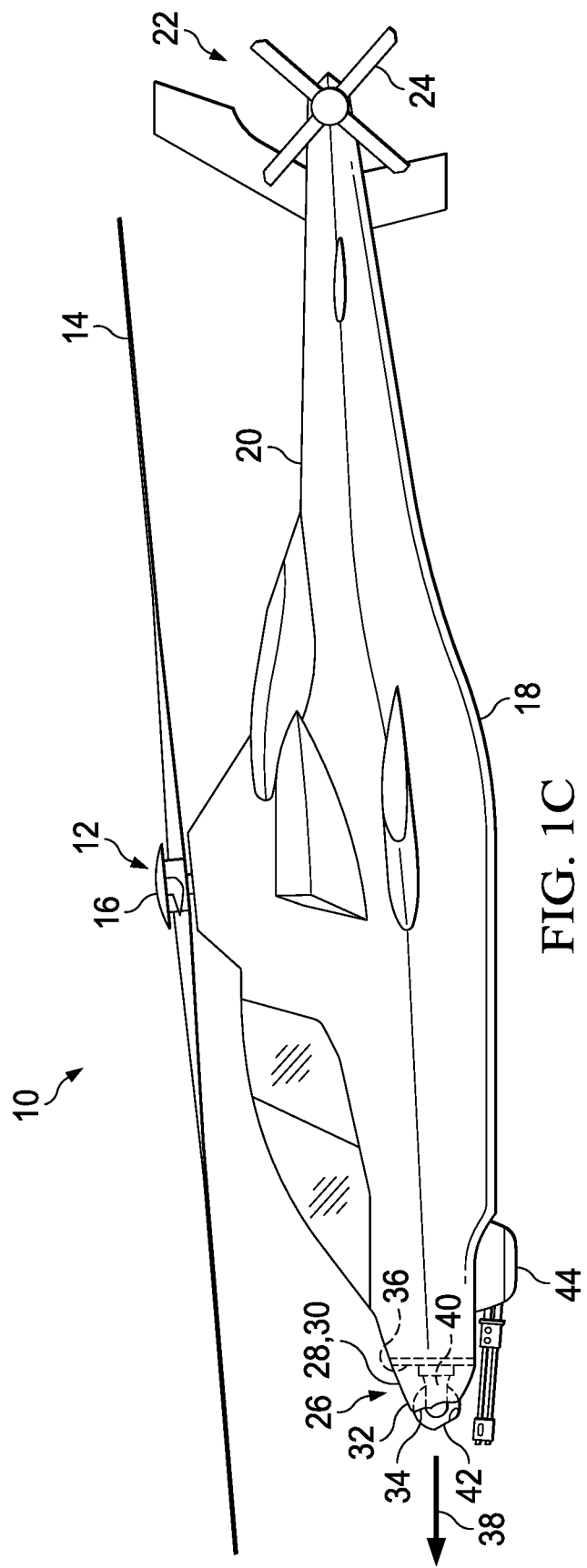

Referring to FIGS. 1A-1C in the drawings, a helicopter is schematically illustrated and generally designated 10. The primary propulsion assembly of helicopter 10 is a main rotor assembly 12. Main rotor assembly 12 includes a plurality of rotor blades 14 extending radially outward from a main rotor hub 16. Main rotor hub 16 is rotatable relative to fuselage 18. The pitch of rotor blades 14 can be collectively and/or cyclically manipulated to selectively control direction, thrust and lift of helicopter 10. A tailboom 20 extends from fuselage 18 in the aft direction. An anti-torque system 22 includes a tail rotor 24 that is rotatably coupled to the aft portion of tailboom 20. Anti-torque system 22 manages the yaw of helicopter 10. A retractable landing gear system (not shown) may provide ground support for helicopter 10.

Fuselage 18 includes a nose assembly 26 at the forward end of helicopter 10. Nose assembly 26 is supported by a nose airframe 28 including nose skin 30. Nose skin 30 forms a nose fairing 32 to provide an aerodynamic forward end of helicopter 10. Nose fairing 32 forms an apex aperture, or hole, 34 located at the apex and forward end of nose assembly 26. Apex aperture 34 is illustrated as having a circular shape, but may have any shape depending on the embodiment. Nose airframe 28 also includes a nonhorizontal mounting surface 36 disposed inside nose fairing 32. In the illustrated embodiment, nonhorizontal mounting surface 36 is vertically oriented so as to be substantially perpendicular to forward flight direction 38 of helicopter 10. Nonhorizontal mounting surface 36, however, may form any nonparallel relationship or angle with forward flight direction 38.

Nose assembly 26 includes a turret assembly 40 mounted on nonhorizontal mounting surface 36. Nose skin 30 partially covers turret assembly 40 such that turret assembly 40 is partially inset in apex aperture 34 of nose fairing 32. Turret assembly 40 includes turret device housing 42, which is rotatable relative to nonhorizontal mounting surface 36. Turret device housing 42 protrudes from apex aperture 34 and is contoured to form an aerodynamic apex for nose assembly 26. As best seen in FIG. 1C, the exposed outer contour of turret device housing 42 is substantially flush with nose skin 30 at apex aperture 34 to integrate turret assembly 40 into the aerodynamic nose of helicopter 10. Turret device housing 42 may include any device(s) suitable for the operation of helicopter 10. In the illustrated embodiment, turret device housing 42 is a turret sensor housing that includes one or more sensors. The types of sensors that may be included in the turret sensor housing are numerous and may include an infrared sensor, such as a forward-looking infrared (FLIR) sensor, a night vision sensor or other optical sensor, a laser sensor, a sound sensor, a motion sensor, a high resolution camera, a radar or any other type of sensor. Such sensors may have a wide variety of uses including in intelligence, surveillance, target acquisition and reconnaissance (ISTAR) and may form an integrated sensor suite.

The direction or orientation of turret device housing 42 may be controlled in a variety of ways. For example, the pilot(s) of helicopter 10 may use manual or voice-activated inputs to rotate turret device housing 42 to direct the device(s) in the turret device housing 42 in a particular direction. In another example, a flight control computer onboard helicopter 10 may direct and control the device(s) in the turret device housing 42 in accordance with a programmed mission, such as a mission to obtain surveillance photographs of a targeted area. In yet another example, ground personnel or computers may remotely communicate with helicopter 10 to provide commands that direct and control the device(s) in the turret device housing 42. Helicopter 10 may be piloted or unmanned. Helicopter 10 may optionally include a second turret assembly 44 rotatably mounted to the underside of fuselage 18. In the illustrated embodiment, turret assembly 44 is a gun turret assembly. In other embodiments, gun turret assembly 44 may be excluded and inset turret assembly 40 may be the sole or primary turret assembly of helicopter 10.

It should be appreciated that helicopter 10 is merely illustrative of a variety of aircraft that can implement the embodiments disclosed herein. Indeed, inset turret assembly 40 may be implemented on any aircraft. Other aircraft implementations can include hybrid aircraft, tiltwing aircraft, quad tiltrotor aircraft, unmanned aircraft, gyrocopters, propeller-driven airplanes, compound helicopters, jets, drones and the like. As such, those skilled in the art will recognize that inset turret assembly 40 can be integrated into a variety of aircraft configurations. It should be appreciated that even though aircraft are particularly well-suited to implement the embodiments of the present disclosure, non-aircraft vehicles and devices can also implement the embodiments.

Figure 2A:
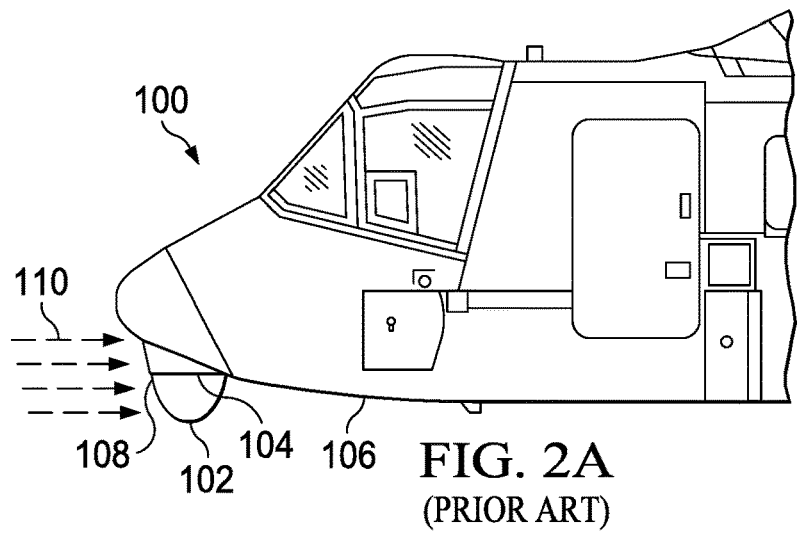
FIGS. 2A-2C are side views of horizontally-mounted turret assemblies juxtaposed with an inset turret assembly in accordance with embodiments of the present disclosure.
Figure 2B:
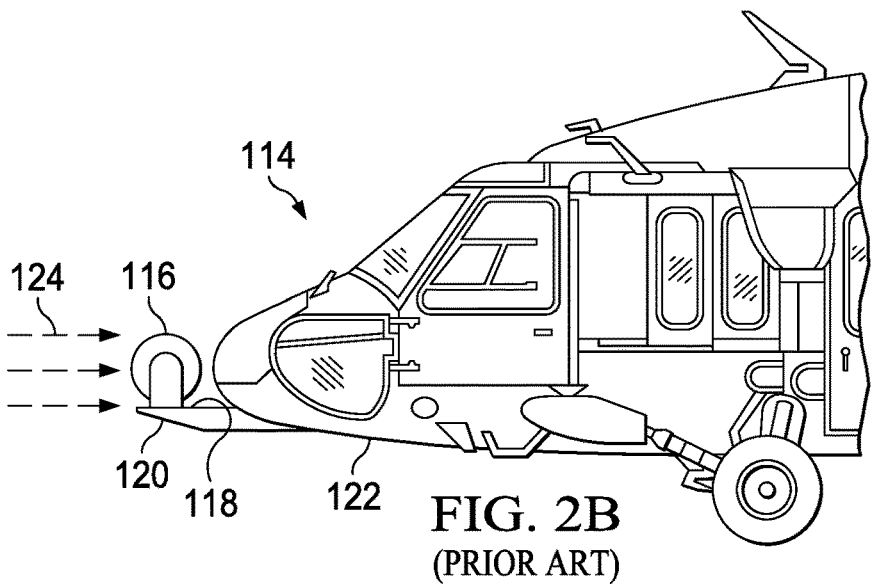
Figure 2C:
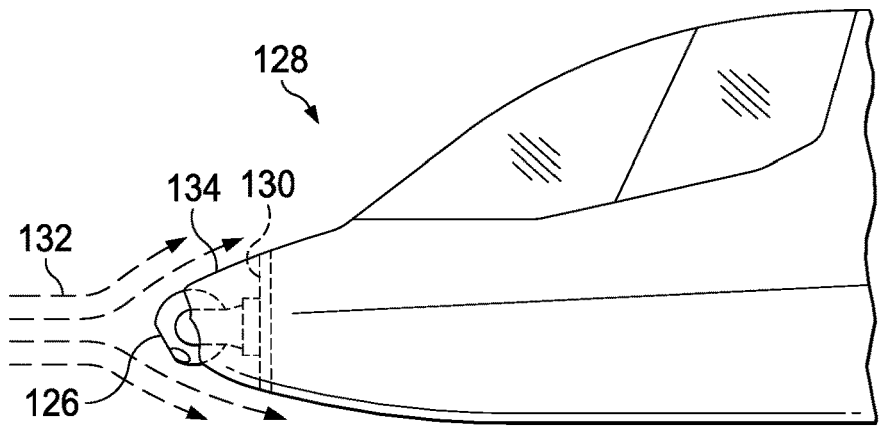
Figure 3A:
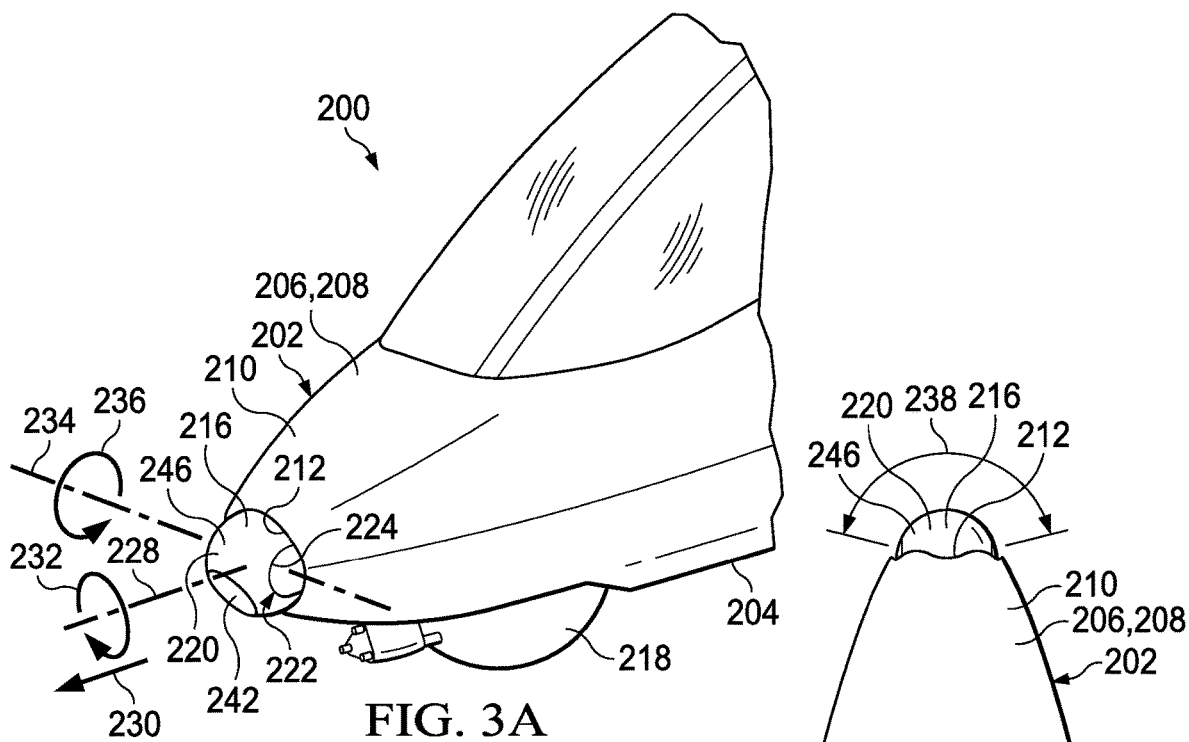
FIGS. 3A-3E are various views of an inset turret assembly in accordance with embodiments of the present disclosure.
Figure 3B:
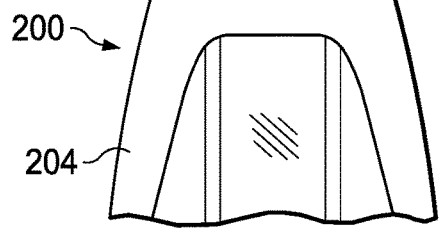
Figure 3C:
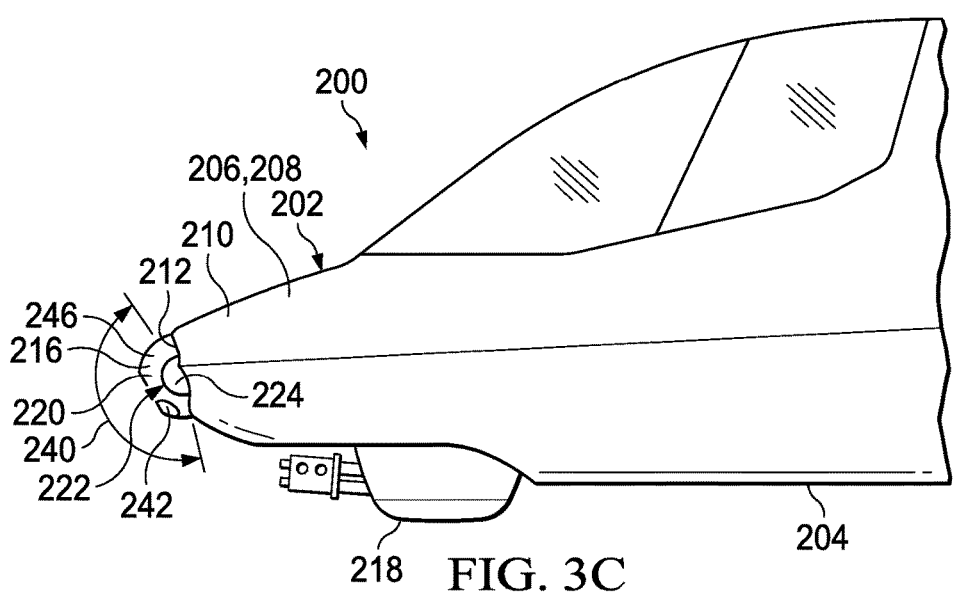
Figure 3D:
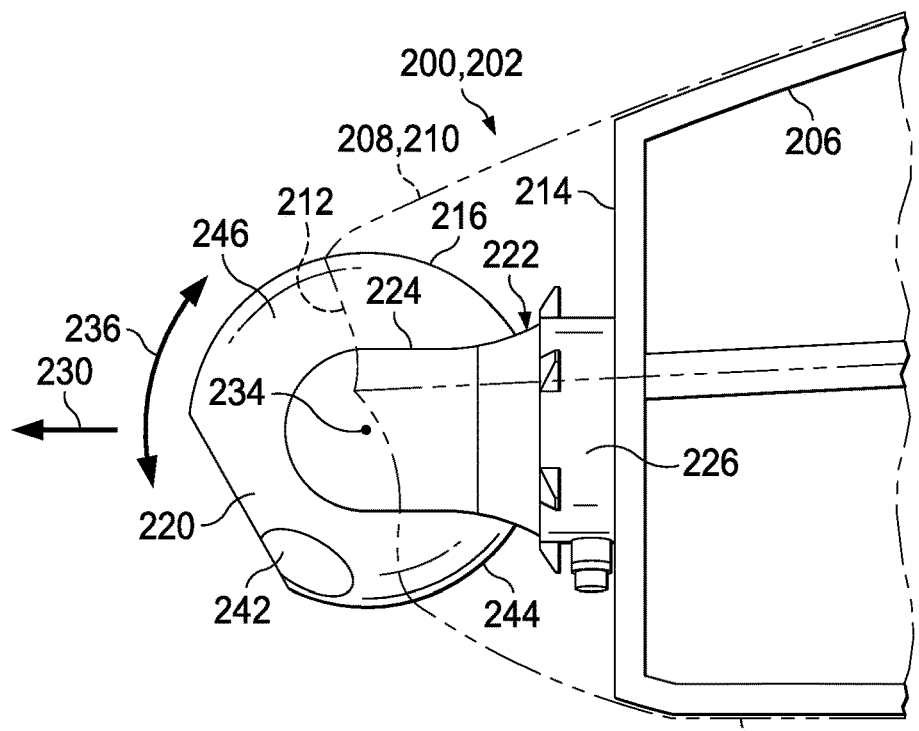
Figure 3E:
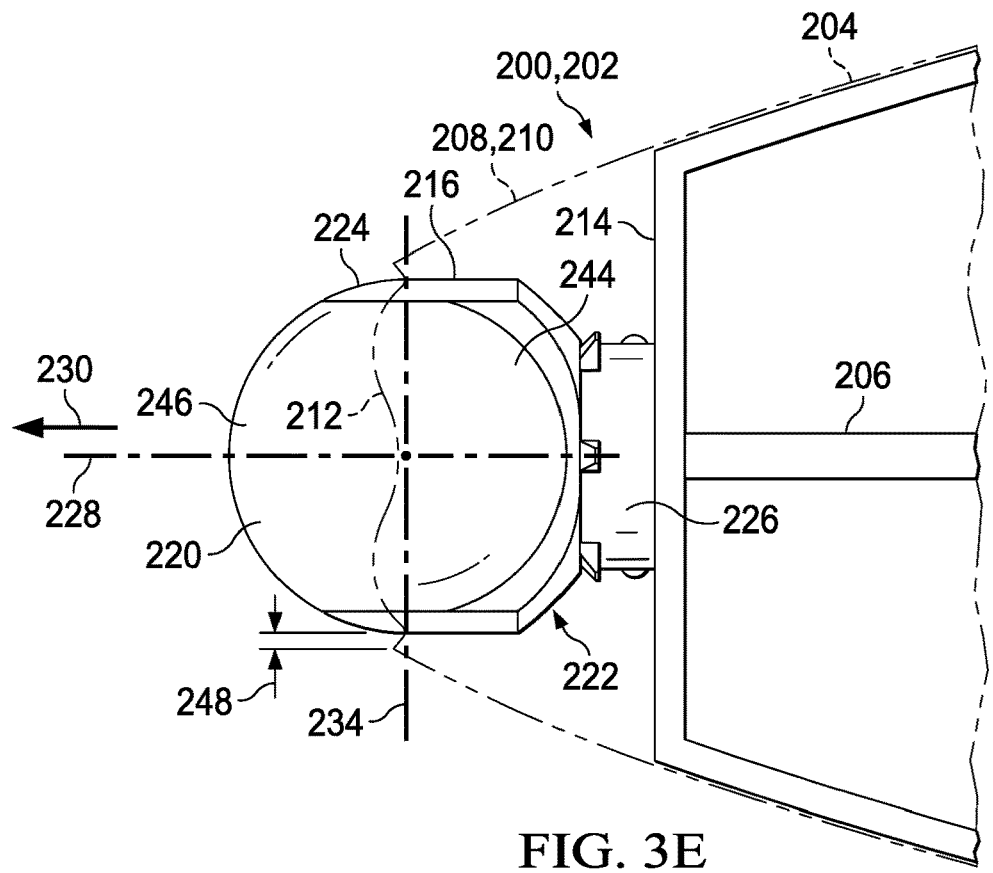

Referring to FIGS. 2A-2C in the drawings, horizontally-mounted turret assemblies currently employed by aircraft are compared to the nonhorizontally-mounted turret assemblies of the illustrative embodiments. In FIG. 2A, aircraft 100 includes a turret assembly 102 mounted on a downward-facing horizontal surface 104. Turret assembly 102 is mounted on the underside of fuselage 106 and protrudes from fuselage 106 in the downward direction. Turret assembly 102 increases forward-facing profile 108 of aircraft 100, which opposes airflow 110 in forward flight and therefore increases the drag penalty of aircraft 100. In FIG. 2B, aircraft 114 includes a turret assembly 116 mounted on an upward-facing horizontal surface 118. In contrast to turret assembly 102 of FIG. 2A, turret assembly 116 protrudes in the upward direction. Turret assembly 116 is mounted to a forward appendage 120 protruding from the nose of aircraft 114, but may alternatively be mounted on an upward-facing horizontal surface of fuselage 122. Turret assembly 116 is not aerodynamically streamlined or integrated with either the nose assembly of aircraft 114 nor any other portion of aircraft 114, thus increasing the drag experienced by aircraft 114 in response to airflow 124 during forward flight.

In contrast to turret assemblies 102, 116 of FIGS. 2A and 2B, which are mounted on horizontal surfaces 104, 118, turret assembly 126 of aircraft 128 in FIG. 2C is mounted to a nonhorizontal, and in this case vertical, mounting surface 130. Turret assembly 126 is also contoured to form an aerodynamic forward end of aircraft 128 to reduce air resistance to airflow 132 in forward flight, thereby reducing the drag experienced by aircraft 128. Skin 134 covers a portion of turret assembly 126 to further streamline aircraft 128 in forward flight. The potential to nonhorizontally mount turret assemblies has been overlooked in previous aircraft designs due to the ease, predictability and perceived structural benefits of horizontally mounting turret assemblies. Horizontally-mounted turret assemblies, however, fail to take into account the enhanced maneuverability of modern aircraft, which allows the airframes of such aircraft to withstand loads in various angles and orientations. In the example of FIG. 2C, nonhorizontal mounting surface 130 may be part of the airframe of aircraft 128 that provides support for both turret assembly 126 and aircraft 128 itself. It will be appreciated by one of ordinary skill in the art, however, that turret assembly 126 is not limited to being mounted only to nonhorizontal airframe elements, and may instead be mounted to structural elements that do not necessarily contribute to the strength of the airframe of aircraft 128 but nonetheless provide support for turret assembly 126.

Referring to FIGS. 3A-3E in the drawings, an aircraft including an inset turret assembly is schematically illustrated and generally designated 200. Nose assembly 202 of fuselage 204 is supported by nose airframe 206. Nose airframe 206 includes nose skin 208, which forms nose fairing 210 having apex aperture 212. Nose airframe 206 also includes nonhorizontal mounting surface 214 on which turret assembly 216 is mounted. Nose skin 208 partially covers turret assembly 216 such that turret assembly 216 is partially inset in apex aperture 212 of nose fairing 210. Aircraft 200 includes a weapons turret 218 on the underside of fuselage 204, although in other embodiments weapons turret 218 may be excluded.

Nonhorizontal mounting surface 214 is a substantially vertical mounting surface disposed inside nose fairing 210. Nonhorizontal mounting surface 214 provides a flat plane on which turret assembly 216 may be mounted. In other embodiments, nonhorizontal mounting surface 214 may instead or also include one or more beams, a gantry, a scaffold or any other structure capable of supporting turret assembly 216. Turret assembly 216 protrudes from nonhorizontal mounting surface 214 in the forward direction. Turret assembly 216 includes a turret device housing 220, which is rotatable relative to nonhorizontal mounting surface 214. Turret device housing 220 is substantially spherical to form a turret ball. Turret device housing 220 is rotatably coupled to nonhorizontal mounting surface 214 by turret mount 222. Turret mount 222 includes a forked housing mount 224 and a base 226. Base 226 is interposed between forked housing mount 224 and nonhorizontal mounting surface 214 and is disposed inside nose fairing 210.

Turret mount 222 provides a gimbal to allow turret device housing 220 to rotate about at least two axes. In particular, forked housing mount 224 is rotatable about a longitudinal axis 228 parallel to forward flight direction 230 of aircraft 200, as indicated by rotational motion arrow 232. Forked housing mount 224 is thus rotatable relative to nonhorizontal mounting surface 214. Turret device housing 220 is rotatably coupled to forked housing mount 224 about a lateral axis 234 perpendicular to forward flight direction 230 of aircraft 200, as indicated by rotational motion arrow 236. Gimballing turret device housing 220 in this manner provides turret device housing 220 wide horizontal and vertical fields of view 238, 240, enabling any device housed by or coupled to turret device housing 220, such as sensor 242, to be aimed or swept through a large cone of fire. Depending on the device housed by or coupled to turret device housing 220 and the operational requirements of aircraft 200, horizontal and vertical fields of view 238, 240 may each form an acute angle, right angle, obtuse angle, straight angle or reflex angle. Horizontal and vertical fields of view 238, 240 may form congruent or noncongruent angles.

The extent to which nose fairing 210 covers turret assembly 216 may vary. In the illustrated embodiment, nose fairing 210 substantially covers a rear-facing hemisphere 244 of turret device housing 220 and a portion of forked housing mount 224 protrudes from nose fairing 210 through apex aperture 212. In other embodiments, nose fairing 210 may cover 20 percent, 30 percent, 40 percent, 50 percent, 60 percent, 70 percent, 80 percent or other portion of turret device housing 220 and/or turret assembly 216. Outer surface 246 of turret device housing 220 is contoured to form an aerodynamic apex for nose assembly 202 to reduce the drag experienced by aircraft 200. Because turret assembly 216 is inset in the nose of aircraft 200, turret assembly 216 does not adversely contribute to the forward-facing profile of aircraft 200, thereby reducing drag. In some embodiments, gap 248 between turret assembly 216 and the edge of nose fairing 210 defining apex aperture 212 may include air blocking seals or sweeps to further streamline nose assembly 202 and reduce or prevent airflow from entering nose fairing 210.

Figure 4A:
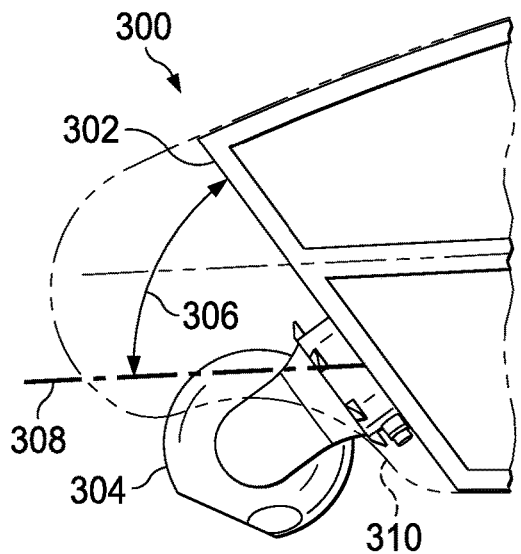
FIGS. 4A-4C are various views of different inset turret assembly configurations in accordance with embodiments of the present disclosure.
Figure 4B:
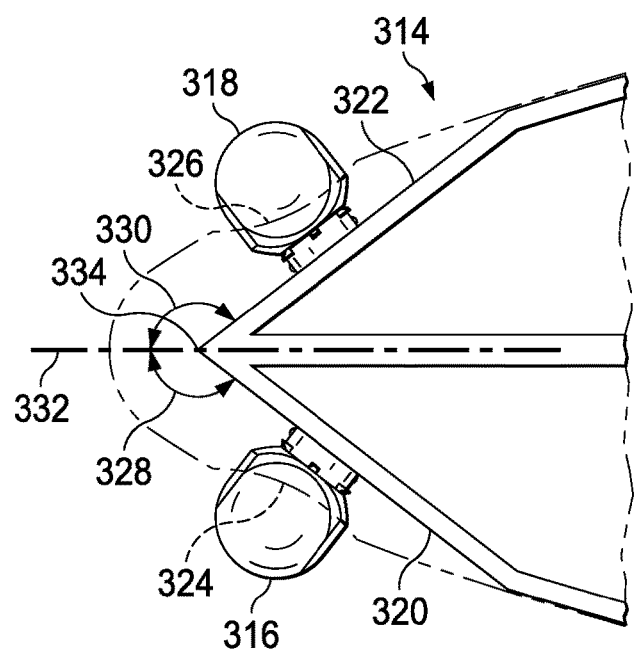
Figure 4C:
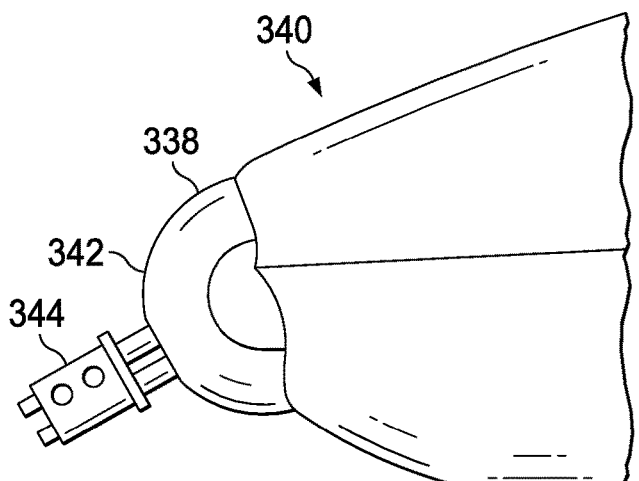

Referring to FIGS. 4A-4C in the drawings, various configurations of different inset turret assemblies are schematically illustrated. FIG. 4A is a side view of a nose assembly 300 including nonhorizontal mounting surface 302 on which turret assembly 304 is mounted. Nonhorizontal mounting surface 302 forms an acute angle 306 with a horizontal plane 308 of the aircraft. Acute angle 306 may be any angle in a range exceeding zero degrees and less than 90 degrees. For example, acute angle 306 may be in a range between 20 and 60 degrees, such as 45 degrees. The downward-facing orientation of nonhorizontal mounting surface 302 causes turret assembly 304 to protrude downward through aperture 310 formed by the underside of nose assembly 300. Angle 306 may also be a right angle, causing turret assembly 304 to protrude through the apex of nose assembly 300, or an obtuse angle, causing turret assembly 304 to protrude through the top side of nose assembly 300. An aperture may be formed by nose assembly 300 at any location from which turret assembly 304 protrudes from the aircraft.

The top view of nose assembly 314 illustrated in FIG. 4B shows left and right turret assemblies 316, 318 mounted to left and right nonhorizontal mounting surfaces 320, 322, respectively. Left and right nonhorizontal mounting surfaces 320, 322 face different directions, providing a multifaceted surface on which turret assemblies 316, 318 may be mounted. Turret assemblies 316, 318 protrude from different portions of nose assembly 314. Left turret assembly 316 protrudes from a left aperture 324 formed by the left side of nose assembly 314 and right turret assembly 318 protrudes from a right aperture 326 formed by the right side of nose assembly 314. Nose assembly 314 may include any number of turret assemblies, such as three, five, eight or any other number of turret assemblies. Left and right nonhorizontal mounting surfaces 320, 322 are nonperpendicular to longitudinal centerline 332 and each form an obtuse angle 328, 330 with longitudinal centerline 332 of the aircraft, respectively. In other embodiments, angles 328, 330 may be right or acute angles. While left and right nonhorizontal mounting surfaces 320, 322 are illustrated as being substantially vertical, in other embodiments left and right nonhorizontal mounting surfaces 320, 322 may be both nonhorizontal and nonvertical to provide an angled surface from which a turret assembly can protrude from nose assembly 314 at any angle. In other embodiments, another turret assembly (not shown) may be mounted on apex 334 at which left and right nonhorizontal mounting surfaces 320, 322 meet.

In FIG. 4C, turret assembly 338 of nose assembly 340 includes a turret weapon housing 342 to which weapon 344 is coupled. The types of weapons that may be coupled to turret weapon housing 342 are numerous and may include guns, lasers, missiles or other weapon types. Turret assembly 338 is not limited to including only weapons or sensors and may include any device suitable for the operation of the aircraft including both military or nonmilitary operations. Also, turret device housings may be readily interchanged to alter the purpose of turret assembly 338. For example, turret weapon housing 342 may be removed from turret assembly 338 and replaced with a similarly-sized multi-sensor turret ball, thereby changing the capabilities of the aircraft. In other embodiments, the device(s) housed by or coupled to turret device housings of the illustrative embodiments may be modular and interchangeable. For example, weapon 344 may be removed from turret weapon housing 342 and replaced with a sensor.

Figure 5A:
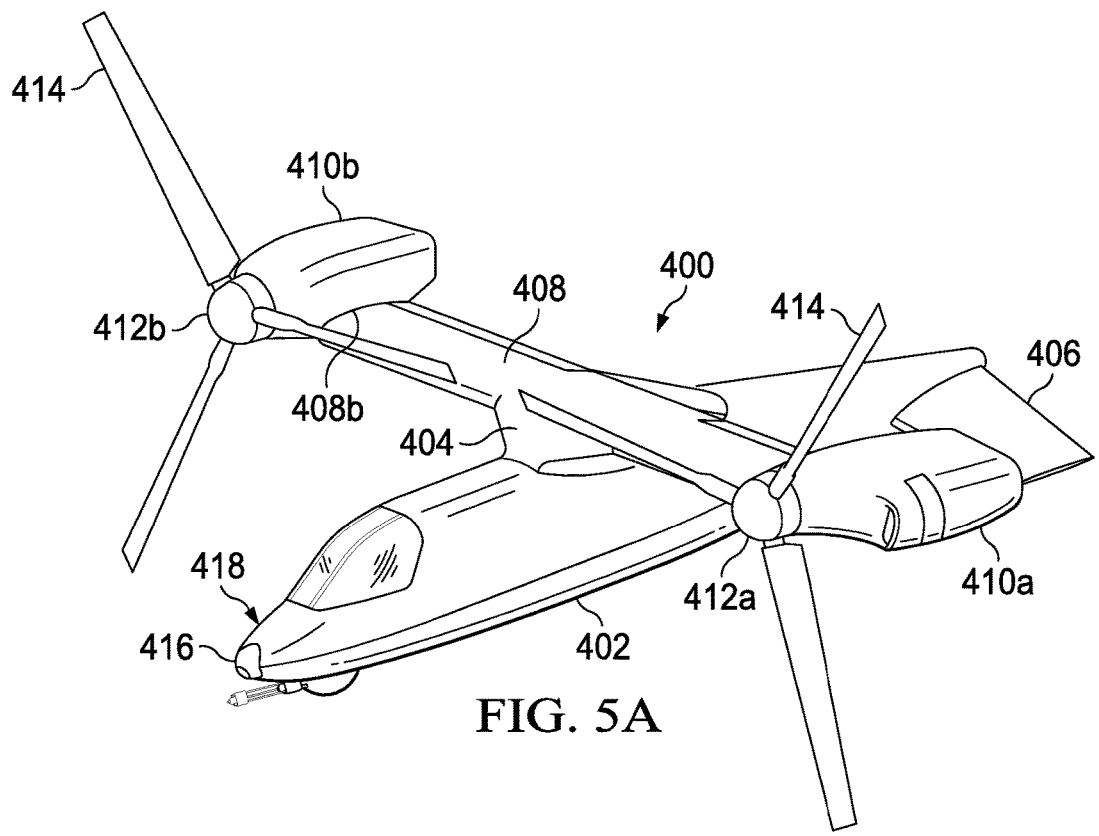
FIGS. 5A-5C are schematic illustrations of a tiltrotor aircraft having an inset turret assembly in accordance with embodiments of the present disclosure.
Figure 5B:
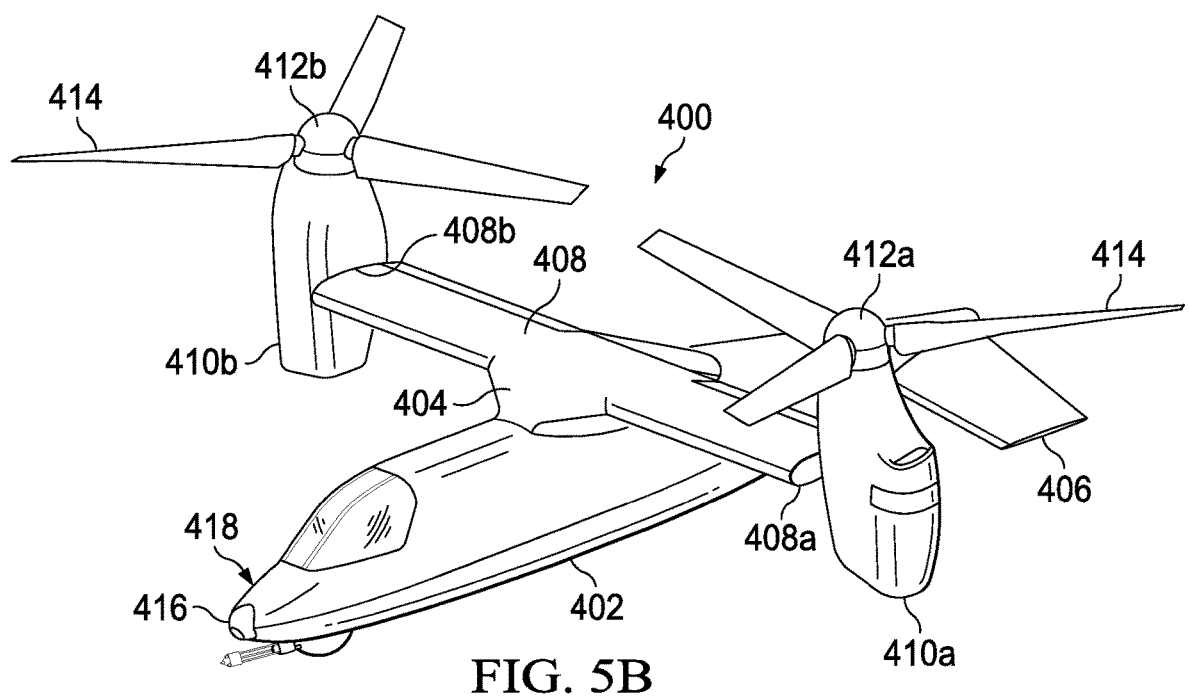
Figure 5C:
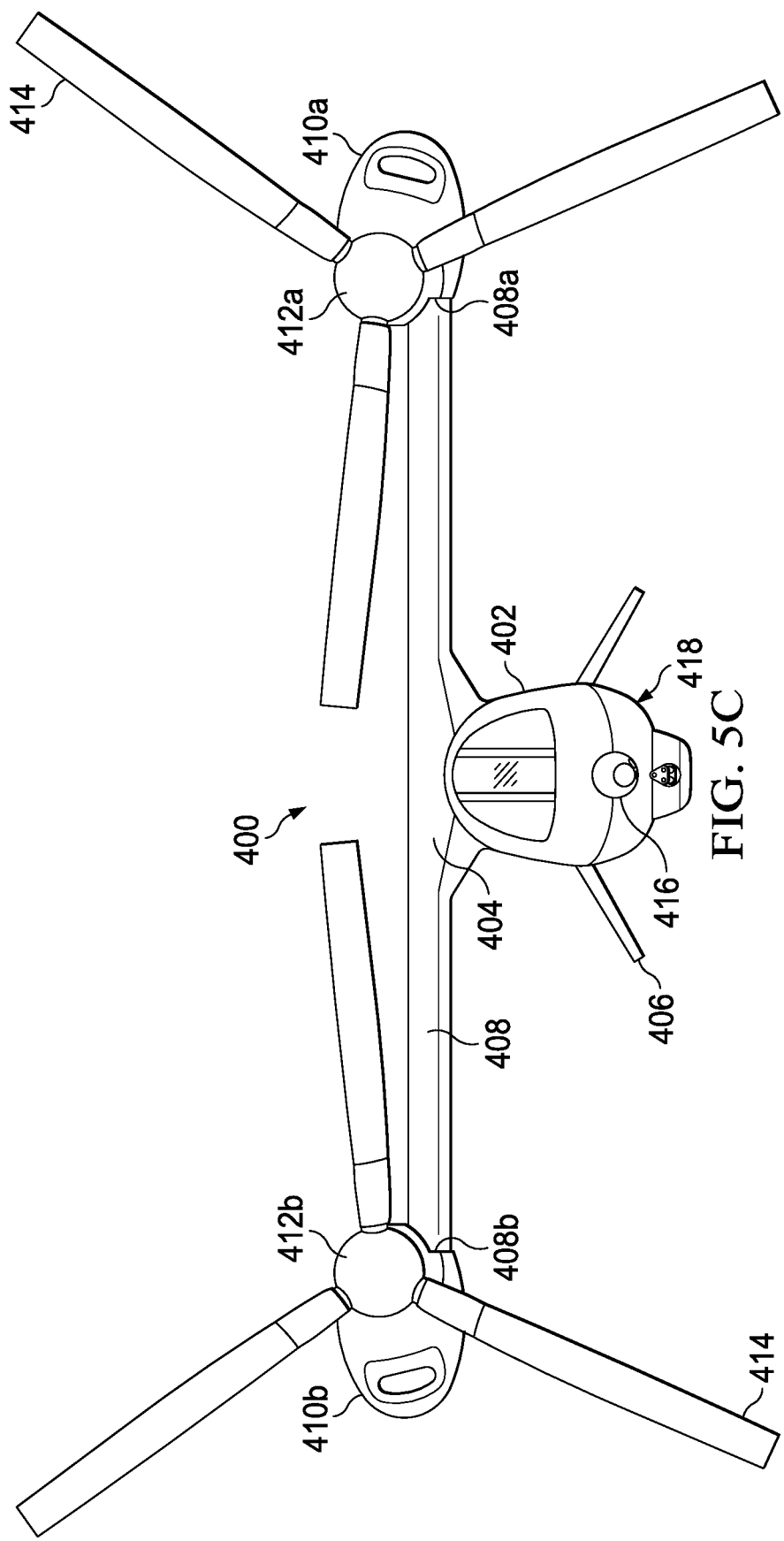

Referring to FIGS. 5A-5C in the drawings, a tiltrotor aircraft is schematically illustrated and generally designated 400. Tiltrotor aircraft 400 includes a fuselage 402, a wing mount assembly 404 and a tail assembly 406. Tail assembly 406 may have control surfaces operable for horizontal and/or vertical stabilization during flight. A landing gear system (not shown) may provide ground support for tiltrotor aircraft 400. A wing 408 is supported by fuselage 402 and wing mount assembly 404.

Coupled to outboard ends 408a, 408b of wing 408 are pylon assemblies 410a, 410b. Pylon assembly 410a is rotatable relative to wing 408 between a generally horizontal orientation, as best seen in FIG. 5A, and a generally vertical orientation, as best seen in FIG. 5B. Pylon assembly 410a includes a rotatable portion of the drive system and a proprotor assembly 412a that is rotatable responsive to torque and rotational energy provided by an engine or motor of the drive system. Likewise, pylon assembly 410b is rotatable relative to wing 408 between a generally horizontal orientation, as best seen in FIG. 5A, and a generally vertical orientation, as best seen in FIG. 5B. Pylon assembly 410b includes a rotatable portion of the drive system and a proprotor assembly 412b that is rotatable responsive to torque and rotational energy provided by an engine or motor of the drive system. In the illustrated embodiment, proprotor assemblies 412a, 412b each include three proprotor blade assemblies 414. It should be understood by those having ordinary skill in the art, however, that proprotor assemblies 412a, 412b could alternatively have a different number of proprotor blade assemblies, either less than or greater than three. In addition, it should be understood that the position of pylon assemblies 410a, 410b, the angular velocity or revolutions per minute (RPM) of proprotor assemblies 412a, 412b, the pitch of proprotor blade assemblies 414 and the like may be controlled by the pilot of tiltrotor aircraft 400 and/or a flight control system to selectively control the direction, thrust and lift of tiltrotor aircraft 400 during flight.

FIG. 5A illustrates tiltrotor aircraft 400 in a forward flight mode or airplane flight mode, in which proprotor assemblies 412a, 412b are positioned to rotate in a substantially vertical plane and provide a forward thrust while a lifting force is supplied by wing 408 such that tiltrotor aircraft 400 flies much like a conventional propeller driven aircraft. FIG. 5B illustrates tiltrotor aircraft 400 in a vertical takeoff and landing (VTOL) flight mode or helicopter flight mode, in which proprotor assemblies 412a, 412b are positioned to rotate in a substantially horizontal plane and provide a vertical thrust such that tiltrotor aircraft 400 flies much like a conventional helicopter. During operation, tiltrotor aircraft 400 may convert from helicopter flight mode to airplane flight mode following vertical takeoff and/or hover. Likewise, tiltrotor aircraft 400 may convert back to helicopter flight mode from airplane flight mode for hover and/or vertical landing. In addition, tiltrotor aircraft 400 can perform certain flight maneuvers with proprotor assemblies 412a, 412b positioned between airplane flight mode and helicopter flight mode, which can be referred to as conversion flight mode.

Wing 408 and pylon assemblies 410a, 410b form part of a propulsion and lift system for tiltrotor aircraft 400. Fuselage 402 may include a drive system, including an engine, motor and/or transmission, for providing torque and rotational energy to each proprotor assembly 412a, 412b via one or more drive shafts located in wing 408. In other embodiments, each pylon assembly 410a, 410b houses a drive system, such as an engine, motor and/or transmission, for supplying torque and rotational energy to a respective proprotor assembly 412a, 412b. In such embodiments, the drive systems of each pylon assembly 410a, 410b may be coupled together via one or more drive shafts located in wing 408 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Turret assembly 416 is inset in nose assembly 418 of fuselage 402, thus demonstrating the wide variety of aircraft types on which the illustrative embodiments may be implemented. Turret assembly 416 includes features similar to those of turret assembly 40 in FIGS. 1A-1C and turret assembly 216 in FIGS. 3A-3E. In yet other embodiments, one or more turret assemblies may be inset on the forward edges or downward sides of wing 408 and/or pylon assemblies 410a, 410b. For example, turret assemblies may be inset in either or both of proprotor assemblies 412a, 412b.

Figure 6A:
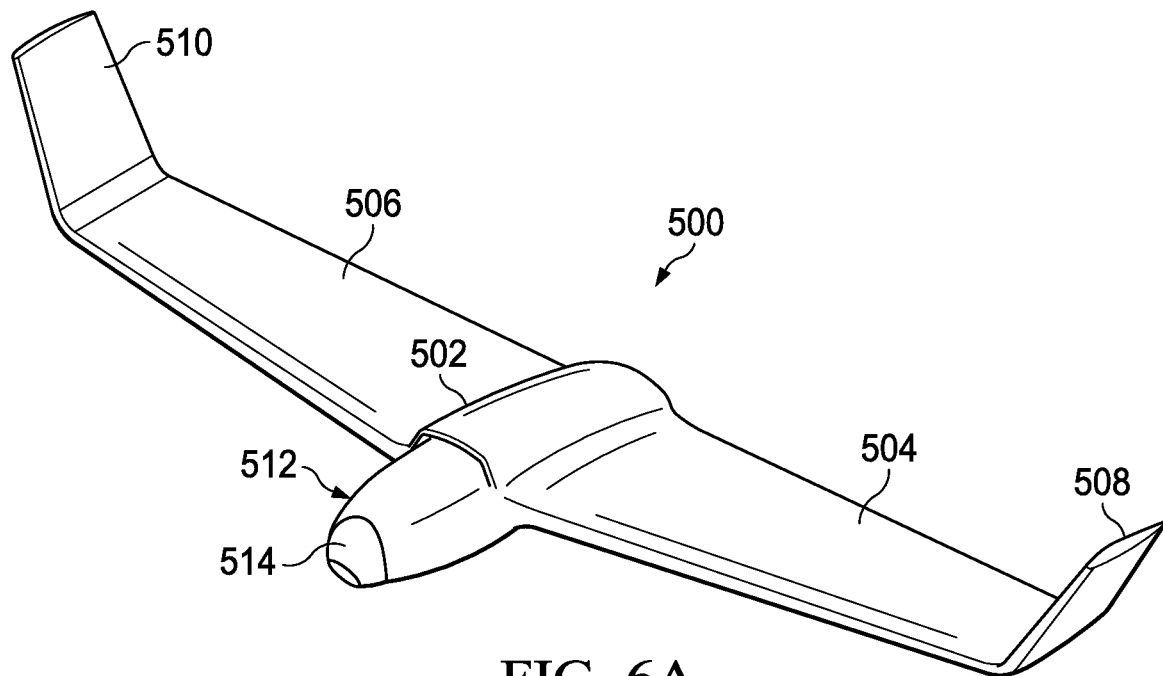
FIGS. 6A-6B are schematic illustrations of an unmanned aerial system having an inset turret assembly in accordance with embodiments of the present disclosure.
Figure 6B:
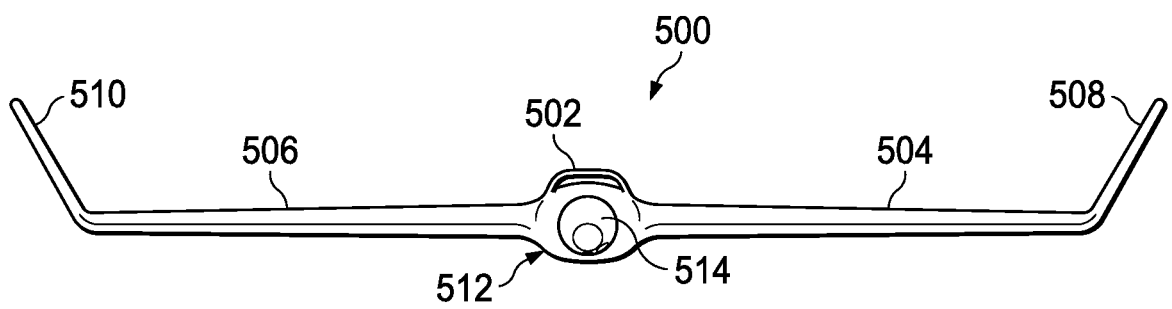

Referring to FIGS. 6A-6B in the drawings, an unmanned aerial system including an inset turret assembly is schematically illustrated and generally designated 500. Unmanned aerial system 500 includes fuselage 502 from which wings 504, 506 protrude. Wings 504, 506 include winglets 508, 510. Fuselage 502 houses a propulsion assembly to propel unmanned aerial system 500 in a forward direction. Nose assembly 512 of fuselage 502 includes inset and rotatable turret assembly 514 mounted on a nonhorizontal surface inside fuselage 502 and having other features as described in the illustrative embodiments. For example, unmanned aerial system 500 may be equipped for reconnaissance missions and turret assembly 514 may include a gimballed multi-sensor turret ball with a wide field of view to detect targeted elements and/or movement on the ground. Because unmanned aerial system 500 does not accommodate an onboard pilot, the orientation of turret assembly 514 may be controlled remotely from the ground or from elsewhere by a person or computer. For example, unmanned aerial system 500 may include a flight control computer, housed within fuselage 502, to process and send flight commands as well as turret assembly commands that point turret assembly in a particular direction.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A nose assembly for a tiltrotor aircraft having a forward flight mode and a vertical takeoff and landing flight mode, the nose assembly comprising:
   a nose airframe including a nonhorizontal mounting surface forming an acute angle with a horizontal plane of the aircraft; and
   a turret assembly mounted on the nonhorizontal mounting surface, the turret assembly including a turret device housing rotatable relative to the nonhorizontal mounting surface;
   wherein, the nose airframe further comprises a nose skin forming a nose fairing and having an underside, the underside of the nose skin forming an aperture, the nose skin at least partially covering the turret assembly such that the turret assembly is at least partially inset in the aperture of the nose skin; and
   wherein, the turret device housing is rotatable about at least two axes including an axis extending through the aperture formed by the underside of the nose skin.

2. The nose assembly as recited in claim 1 wherein the nonhorizontal mounting surface is disposed inside the nose fairing.

3. The nose assembly as recited in claim 1 wherein the turret assembly protrudes from the nonhorizontal mounting surface in a downward direction.

4. The nose assembly as recited in claim 1 wherein the turret device housing further comprises a gimballing turret device housing.

5. The nose assembly as recited in claim 1 wherein the turret assembly further comprises a turret mount coupling the turret device housing to the nonhorizontal mounting surface.

6. The nose assembly as recited in claim 5 wherein the turret mount further comprises a base and a forked housing mount, the base disposed inside the nose fairing.

7. The nose assembly as recited in claim 6 wherein the forked housing mount is rotatable about a longitudinal axis.

8. The nose assembly as recited in claim 6 wherein the turret device housing is rotatably coupled to the forked housing mount.

9. The nose assembly as recited in claim 6 wherein the forked housing mount protrudes from the nose fairing through the aperture.

10. The nose assembly as recited in claim 1 wherein the turret device housing further comprises a turret sensor housing including one or more sensors.

11. The nose assembly as recited in claim 10 wherein the one or more sensors further comprise an integrated sensor suite.

12. The nose assembly as recited in claim 1 wherein the turret device housing further comprises a turret weapon housing including a weapon.

13. The nose assembly as recited in claim 1 wherein the turret device housing is substantially spherical to form a turret ball.

14. The nose assembly as recited in claim 1 wherein the acute angle formed by the nonhorizontal mounting surface and the horizontal plane of the aircraft is in a range between 20 degrees and 60 degrees.

15. The nose assembly as recited in claim 14 wherein the acute angle formed by the nonhorizontal mounting surface and the horizontal plane of the aircraft is a 45 degree angle.

16. A tiltrotor aircraft having a forward flight mode and a vertical takeoff and landing flight mode, the tiltrotor aircraft comprising:
   a fuselage;
   a wing supported by fuselage;
   first and second proprotor assemblies coupled the to the wing, the proprotor assemblies rotatable in a substantially vertical plane in the forward flight mode and in a substantially horizontal plane in the vertical takeoff and landing flight mode; and
   a nose assembly positioned at a forward end of the fuselage, the nose assembly comprising:
      a nose airframe including a nonhorizontal mounting surface forming an acute angle with a horizontal plane of the aircraft; and a turret assembly mounted on the nonhorizontal mounting surface, the turret assembly including a turret device housing rotatable relative to the nonhorizontal mounting surface;

wherein, the nose airframe further comprises a nose skin forming a nose fairing and having an underside, the underside of the nose skin forming an aperture, the nose skin at least partially covering the turret assembly such that the turret assembly is at least partially inset in the aperture of the nose skin; and wherein, the turret device housing is rotatable about at least two axes including an axis extending through the aperture formed by the underside of the nose skin.

17. The tiltrotor aircraft as recited in claim 16 wherein the turret device housing further comprises an outer surface contoured to form an aerodynamic surface.

18. The tiltrotor aircraft as recited in claim 16 wherein the nose fairing covers at least 30 percent of the turret device housing.

19. The tiltrotor aircraft as recited in claim 16 wherein the turret device housing further comprises a turret sensor housing including one or more sensors.

* * * * *